United States Patent [19]

O'Loughlin

[11] Patent Number: 4,976,627
[45] Date of Patent: Dec. 11, 1990

[54] GRID/GROUND CONNECTOR

[75] Inventor: Francis A. O'Loughlin, Scotch Plains, N.J.

[73] Assignee: Thomas & Betts Corporation, Bridgewater, N.J.

[21] Appl. No.: 488,189

[22] Filed: Mar. 5, 1990

Related U.S. Application Data

[63] Continuation of Ser. No. 331,978, Mar. 31, 1989, abandoned.

[51] Int. Cl.$^5$ .......................... H01R 4/20; H01R 4/66
[52] U.S. Cl. ..................................... 439/100; 439/880; 174/71 R
[58] Field of Search ...................... 174/71 R, 72 R, 78; 248/61, 63, 68.1; 403/169–171; 439/100, 880

[56] References Cited

U.S. PATENT DOCUMENTS

| | | | |
|---|---|---|---|
| 1,276,228 | 8/1918 | Keenan | 174/172 |
| 2,760,798 | 8/1956 | Evans | 287/49 |
| 2,786,192 | 3/1957 | Woolley, Jr. | 339/276 |
| 3,048,650 | 8/1962 | Allen et al. | 174/90 |
| 3,074,150 | 1/1963 | Berg | 29/155.55 |
| 3,151,211 | 9/1964 | Reid et al. | 174/72 |
| 3,297,817 | 1/1967 | Stier | 174/71 R |
| 3,365,693 | 1/1968 | Browne | 339/14 |
| 3,546,664 | 12/1970 | DeBolt et al. | 339/256 |
| 3,604,837 | 9/1971 | Mixon, Jr. | 174/72 R |
| 4,342,495 | 8/1982 | Bennett et al. | 339/163 |

Primary Examiner—Gary F. Paumen
Attorney, Agent, or Firm—Robert M. Rodrick; Salvatore J. Abbruzzese

[57] ABSTRACT

An electrical connector for mechanically and electrically connecting conductors is disclosed. The connector includes a connector body formed of conductive metal. A plurality of legs extend from a central planar member of the connector body to individually support, in mechanical and electrical engagement, electrical conductors. Each connector accommodating portion is disposed in a plane spaced from the plane of the central planar member. This permits accommodation of insulated conductors in the connector and further accommodates plural conductors in a crossover fashion.

10 Claims, 4 Drawing Sheets

GRID/GROUND CONNECTOR

This is a continuation of application Ser. No. 331,978, filed Mar. 31, 1989, now abandoned.

FIELD OF THE INVENTION

The present invention relates generally to a cable connector for electrically and mechanically connecting an electrical conductor to a metallic structural member and more particularly to a cable connector for attaching one or more conductors to a support structure for use as a signal reference grid.

BACKGROUND OF THE INVENTION

Grounding of electrical systems is a practice which accomplishes multiple functions. Foremost among these functions is the avoidance of shock hazard due to lightning, power surges, ground faults and inadvertent contact with high voltage lines. To prevent personal injury due to such electrical hazards, it has long been known in the electrical field to use low resistance ground connections to earth.

However, with the advent and widespread use of highly sensitive computer components, grounding has also been identified as necessary for the reliable operation of such components. Typically, computers and other advanced data processing equipment are housed and used in a dedicated room or area in a commercial building. These rooms are usually well air-conditioned to avoid equipment over-heating and thus have low-humidity level. Computer operators and other personnel working in these areas can create a build-up of static electricity in their body as a result of movement in this dry environment. Subsequent contact with static sensitive computer equipment can dissipate this static charge through the equipment, impeding its operating reliability. Therefore, static shielding of computer equipment is highly desirable. Further, the signal frequencies of high speed computers reach and exceed 10 megahertz. The radiation of these high frequencies also proves to be troublesome to computer operation. Thus, shielding of computer circuits from such signal "noise" is also advantageous.

One method currently practiced in providing signal and static grounding is to employ a signal reference grid beneath the floor supporting the computer equipment. The signal reference grid, which is typically run in a tortuous path beneath the floor, is electrically connected along its length to the various computer components and at one end directly or indirectly to earth. This provides adequate signal grounding, thus reducing signal "noise" radiated at high frequencies. Further, the signal reference grid is also useful in providing static protection to the computer hardware. The raised flooring in a computer area is typically formed of a semi-conductive material, and is supported on modular floor supports made of steel or aluminum. It is desirous to electrically connect the floor supports to the signal reference grid thus placing the floor and the computer terminals at the same electrical potential. A computer operator standing on the semi-conductive floor will thus be at the same electrical potential as the computer terminal, eliminating any chances of static dissipation between the operator and the terminal.

The art has seen various types of grounding connectors and the like which connect one cable to another. Examples of these are shown in U.S. Pat. Nos. 1,276,228; 2,760,748 and 2,786,192. However, these connectors all terminate noninsulated conductors. There is a need for a grounding connector which will readily accommodate a stripped extent of an insulated connector. Also, the connector should provide for the crossover of two conductors where necessary.

SUMMARY OF THE INVENTION

It is therefore an object of the present invention to provide a connection device for mechanically and electrically attaching a conductor to a support member.

It is a further object of the present invention to provide a connector device which will easily connect stripped extents of one or more conductors to a support member, and provide for crossover of the conductors where needed.

These and other objects are achieved in the present invention where an electrical connector for connecting plural insulated electrical conductors is disclosed. Each of the conductors used with the present invention has a bared connection extent free of insulation. The connector includes a body formed of electrically conductive material. The body has a central planar member and plural connection legs extending outwardly from the central planar member. One of the legs includes a conductor engagement portion for engaging the connection extent of one of the conductors. The conductor engagement portion is disposed in a plane which is spaced from the plane of the central planar member. This permits accommodation of the insulation on either side of the bared connection extent of the conductor.

In the preferred embodiment shown by way of example herein, the electrical connector of the present invention accommodates plural electrical conductors. The connector body is formed of electrically conductive material and has a central planar member. A first connection leg extends from the central planar member and includes a first conductor engagement portion for engaging one of the conductors of the plurality. The first conductor engagement portion is disposed in a plane spaced from the plane of the central planar member. A second connection leg also extends from the central planar member. The second connection leg includes a second conductor engagement portion for engaging a second conductor of the plurality. The second conductor engagement portion is disposed in a plane spaced from the plane of the central member. The plane of the central member in the preferred embodiment lies between the planes of the first and second conductor engagement portions. An arrangement in this manner permits conductors to be crossed over one another while secured to the electrical connector of the present invention and allowing uninterrupted continuity in the cable, eliminating splicing of the ground cable.

DETAILED DESCRIPTION OF THE PREFERRED EMBODIMENTS

Figure 1:
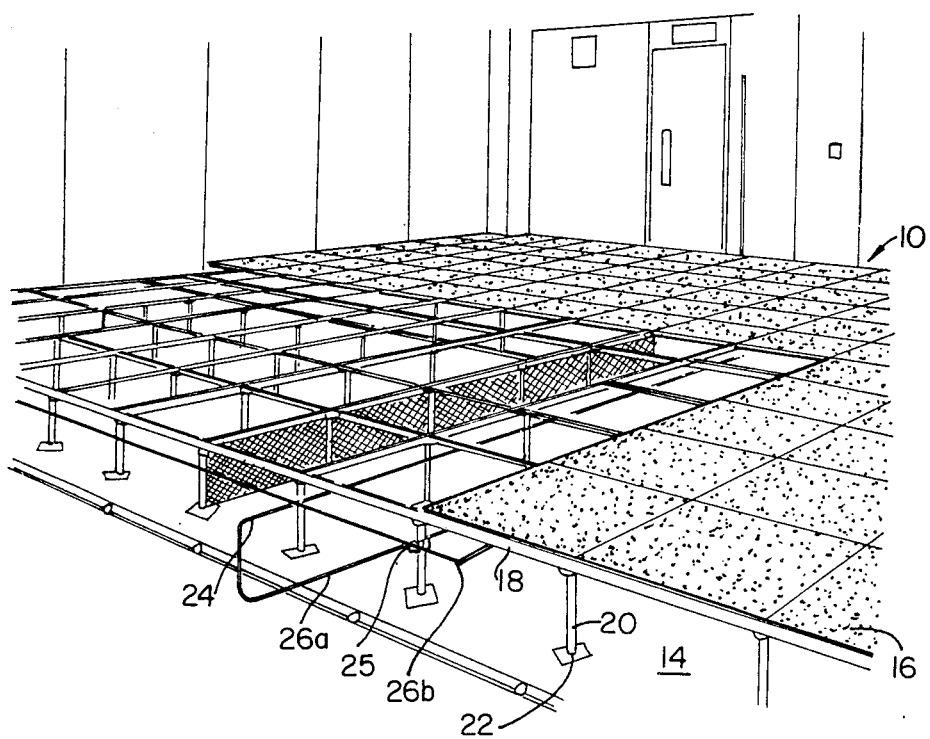
FIG. 1 shows a typical computer equipment room having floor panels supported by floor supports and also shows an under floor signal reference grid running therebelow.
Figure 2:
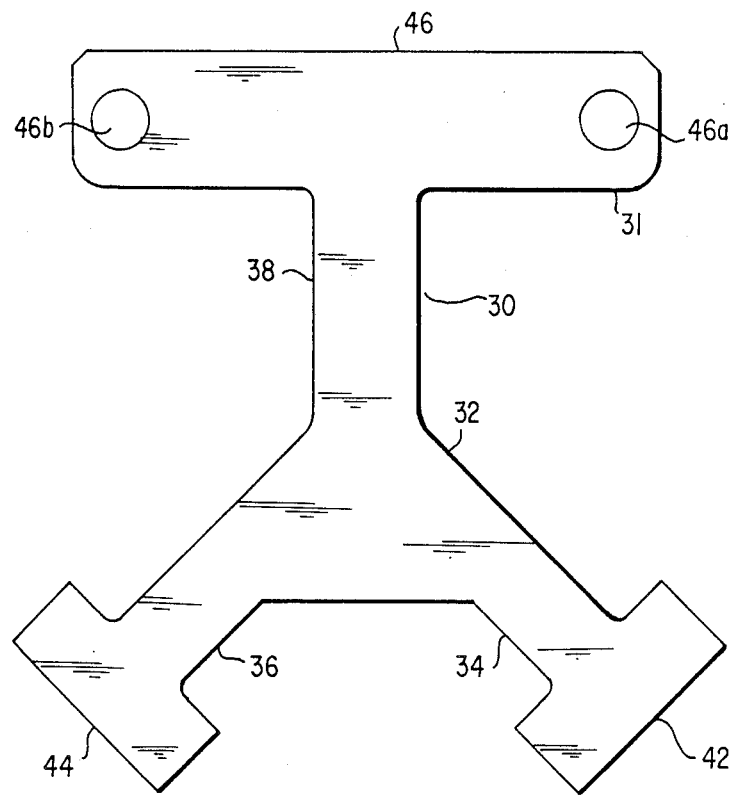
FIG. 2 shows in flat plan view, an embodiment of the ground connector of the present invention prior to forming.

Referring to FIG. 1 is a typical computer equipment room 10 is shown. Computer room 10 includes floor support structures 12 which form a grid type pattern across and raised from the floor 14. The floor support structure 12 supports rectangular floor elements 16. The floor support structure 12 is comprised of cross members 18 and upright supports 20 which are formed of steel, aluminum or other conductive metal. The floor elements 16 are formed of a semi-conductive material or of a floor material having conductive particles impregnated therein. In most computer equipment installations, the supporting floor elements 16 are raised above the floor 14 to accommodate the flow of cooled air necessary for efficient operation of computer equipment.

As above-mentioned, it becomes advantageous to place the computer operator at the same electrical potential as the computer equipment. Thus the conductive floor elements 16 supported by conductive floor support structure 12 is designed to support both the computer equipment (not shown) and the operator (also not shown). As the floor support structure 12 is primarily designed for mechanical strength and stability, the electrical continuity between cross members 18 and upright supports 20 may not be assured. This is particularly true where the upright supports 20 may be secured to a floor plate 22 which is attached to the floor 14 by mastic, glue or other insulative material which would insulate the support structure 12 from ground. In order to place the support structure 12 at ground potential across the entire floor, a signal reference ground grid 24 is employed. Shown raised from floor 14 beneath support structure 12, the ground grid 24 comprises one or more lengths of bare or insulated wires 26a and 26b (generally referred to as wire 26) which are mechanically and electrically secured to the upright supports 20 of support structure 12 at schematically shown connections 25. The wire 26 is secured to multiple upright supports 20 to provide plural electrical connections. Plural areas of connection to support structure 12 is highly desirable as plural connection form parallel paths of electrical continuity. This substantially reduces the impedance level at high frequencies. The wire 26 is then connected to ground (not shown) to place the grid 24 and the support structure 12 at ground potential. As the floor elements 16 are formed of conductive material, both the computer equipment and operator supported on the floor elements 16 will be the same ground potential, thus eliminating any static dissipation between the operator and the equipment.

Referring now to FIGS. 2 through 5, the present invention provides an electrical connector suitable for connecting wires 26a and 26b of signal reference grid 24 to the upright support 20 of support structure 12. Connector 30 is formed from a flat stamping of metal, preferably wrought copper, which is blanked into the shape shown in FIG. 2. Connector 30 includes a central planar portion 32 and three outwardly extending leg portions 34, 36 and 38. Leg portions 34 and 36 are substantially identical and as will be described in detail hereinbelow, serve to accommodate a portion of wire 26 in mechanical and electrical engagement. Leg 38 is designed to mechanically and electrically attach to upright support 20 (FIG. 4) of support structure 12 (FIG. 1). Each of legs 34 and 36 include at the distal extents thereof, a conductor accommodating portion 42 and 44 respectively. Each conductor accommodating portion 42 and 44 is formed from a flat blanked extent lying generally transverse to the remainder of leg 34 and 36.

Leg 38 includes at its distal extent a upright support accommodating portion 46 which is also formed of a flat blanked extent lying transverse to the remainder of leg 38. As will be described in detail hereinbelow, upright support accommodating portion 46 includes a pair of spaced apertures 46a and 46b, which when in use will accommodate a conventional nut and bolt assembly 70 (FIG. 4) to assist in securing connector 30 to upright support 20.

Figure 3:
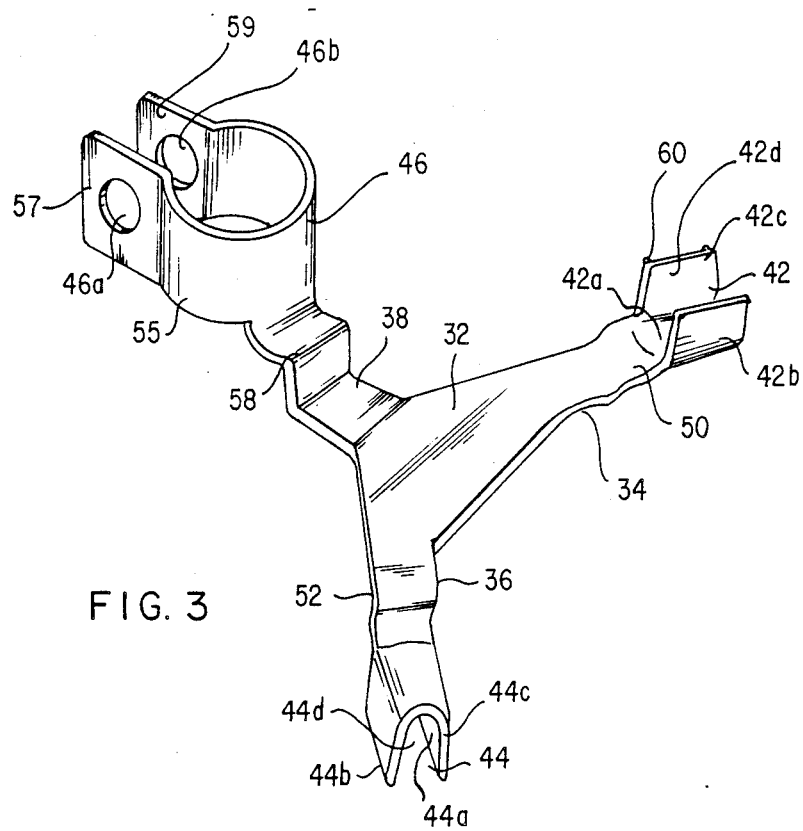
FIG. 3 is a perspective showing of the ground connector of FIG. 2 formed into a usable configuration.
Figure 4:
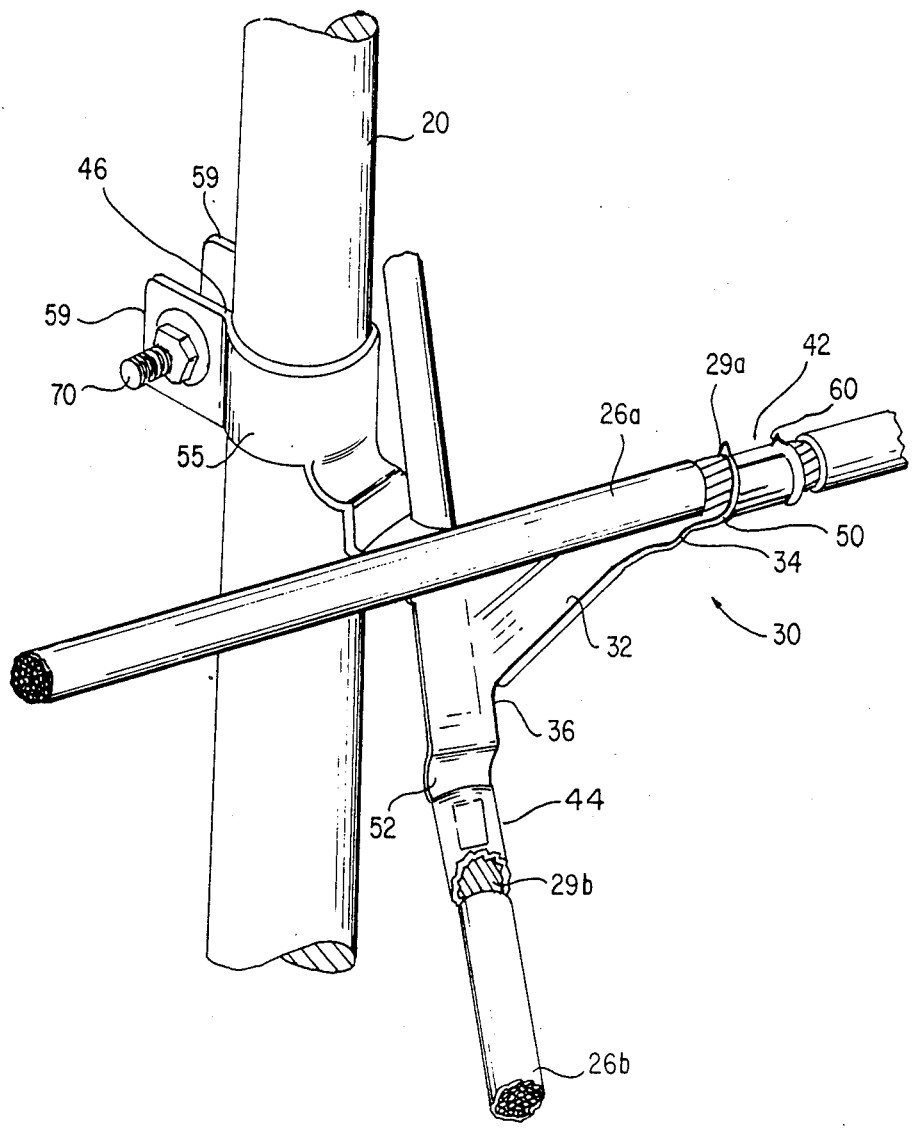
FIG. 4 shows the ground connector of the present invention secured to an upright support and accommodating a pair of ground conductors.

Referring more specifically to FIG. 3, the formation of flat stamping 31 into the usable connector structure is shown. Conductor accommodating portions 42 and 44 respectively of legs 34 and 36 are formed into a U-shape. Referring to leg 34 as illustrative of both legs 34 and 36, conductor accommodating portion 42 includes a bottom wall 42a and a pair of spaced-apart sidewalls 42b and 42c which extend substantially perpendicularly from bottom wall 42a. Bottom wall 42a together with extending sidewalls 42b and 42c form a U-shaped channel 42d for accommodating a bared extent 29a of wire 26a (FIG. 4).

Leg 34 further includes a bent transition region 50 between central planar portion 32 and conductor accommodating portion 42. Transition region 50 provides for disposition of conductor accommodating portion 42 in a plane spaced from the plane of central planar portion 32. More specifically, bottom wall 42a of conductor accommodating portion 42 will lie in a plane which is spaced from the plane of central planar portion 32.

Figure 5:
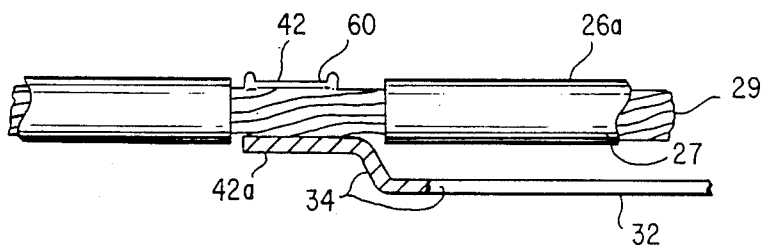
FIG. 5 shows in partial section one leg of the ground connector of FIG. 4 crimped to an electrical conductor.

Referring additionally to FIG. 5 the advantages of such formation may be seen. Quite often it is necessary to use an insulated wire 26a as the ground grid 24. This is especially true where portions of the ground grid 24 may be user accessible. Insulated wire would prevent an electrical hazard. Thus, any ground connector used in this environment must be able to accommodate the thicker insulation 27 surrounding the metallic conductor 29 of wire 26a.

Transition region 50 of leg 34 serves to place the bottom wall 42a of conductor accommodating portion 42 in a plane spaced from the plane of central planar portion 32. The spacing between the respective planes is sufficient to accommodate the thickness of insulation 27 surrounding metallic conductor 29. Without such spacing, connecting an insulated wire 26a to conductor accommodating portion 42 would be difficult as the wire 26a would not lie flat in the U-shaped channel 42d.

Referring again to FIG. 3, leg 36 is formed in a manner similar to that of leg 34. A transition region 52 located between central planar portion 32 and conductor accommodating portion 44 serves to place a bottom wall 44a of conductor accommodating portion in a plane spaced from the plane of central planar portion 32. However, as is seen in FIG. 3, transition portion 52 is bent in a direction opposite the direction of the bend of transition portion 50. Also, sidewalls 44b and 44c extend from bottom wall 44a in a direction opposite that of sidewalls 42b and 42c of conductor accommodating portion 42. Thus, an inverted U-shaped channel 44d is formed.

As will be described in detail hereinbelow this opposite arrangement of conductor accommodating portion 44 with respect to conductor accommodating portion 42 permits connection of two insulated wires 26a and 26b (FIG. 4) in a crossover fashion.

As shown in FIG. 3, upright support accommodating portion 46 at the distal extent of leg 38 is formed in a conventional fashion to accommodate a cylindrical member for mechanical and electrical engagement therewith. Upright support accommodating portion 46 includes a partially open cylindrical barrel 55 and a pair of outwardly extending fingers 57 and 59. Fingers 57 and 59 include respectively, apertures 46a and 46a therethrough.

Leg 38 also includes a bent transition region 58 between central planar portion 32 and upright support accommodating portion 46. This provides added strength to connector 30 and prevents the distal extents of legs 34 and 36 from extending too far from upright support 20 (FIG. 4).

Referring more specifically to FIG. 4, connector 30 is shown secured to upright support 20 of support structure 12 and connected to wires 26a and 26b running in a crossover fashion. Each of conductor accommodating portions 42 and 44 are shown crimped to bared extents 29a and 29b of wires 26a and 26b respectively. Conductor accommodating portions 42 and 44 are crimped to bare extents 29a and 29b in a manner which is well known in the connection art. A suitable crimping tool (not shown) may be employed. In order to accommodate such a crimping tool conductor accommodating portions 42 and 44 include a shaved area 60 (also shown in FIG. 3 and 5) which permits proper location of the dies of the crimping tool with respect to the conductor accommodating portions 42 and 44.

As illustrated in FIG. 4 transition region 50 of leg 34 places conductor accommodating portion 42 in a plane which is spaced above the plane of central planar portion 32. In the same manner, transition region 52 of leg 36 disposes conductor accommodating portion 44 in a plane which is spaced below the plane of central planar portion 32. In other words, central planar portion 32 lies in a plane which is between the respective planes of conductor accommodating portions 42 and 44. Formation in this manner permits two wires 26a and 26b to be connected to connector 30 in a crossover fashion. One wire 26a will run along one side of central planar portion 32 while the other wire 26b will run along the other side of central planar portion 32. The two wires 26a and 26b may be crossed over without mutual interference.

Still referring to FIG. 4, the barrel portion 55 of upright support accommodating portion 46 engages and surrounds upright support 20. Extending fingers 57 and 59 extend beyond upright support 20. Conventional nut and bolt assembly 70 may be secured through apertures 46a and 46b. Screw tightening of the nut and bolt assembly 70 will squeeze fingers 57 and 59 together securely supporting, in mechanical and electrical engagement, upright support accommodating portion 46 to upright support 20. Thus, wires 26a, 26b and upright support 20 will be electrically commoned.

While a barrel portion 55 is shown, upright support accommodating portion 46 may be formed into any desired shape to correspond to the shape of upright support 20.

The present invention, as shown herein, is particularly useful in electrically connecting one or more wires 26 to the support structure 12 of a raised floor system. However, the concepts of the present invention may be employed in a simple electrical connector which connects one conductor to another without further connecting the conductors to a support structure.

Additionally, the present invention is not limited in use for making ground connections in computer room applications. Rather, the present invention may also be used to make ground connections in other environments such as underground cable or overhead suspended cable. It is even contemplated that in certain limited applications the connector of the present invention may make power connections.

Various changes to the foregoing described and shown structures would now be evident to those skilled in the art. Accordingly, the particularly disclosed scope of the invention is set forth in the following claims.

What is claimed is:

1. An electrical termination device for terminating at least one elongate insulated electrical conductor, said conductor having a connection extent free of said insulation, said device comprising:

a one-piece body formed of electrically conductive material;

said body having a central planar member and plural connection legs extending outwardly from and directly attached to said central planar member; and a first said connection leg including a first conductor engagement portion including in an uncrimped condition a first support wall and a first pair of outwardly extending side walls for supporting therebetween said connection extent, said first support wall being substantially disposed in a plane spaced from and parallel to said plane of said central member and said first pair of side walls extending substantially perpendicular to said plane of said first support wall and to the plane of said central planar member for crimping around said connection extent.

2. The electrical termination device of claim 1 wherein said first connection leg has a first leg portion extending from and co-planar with said central planar member and a first transition portion connecting said first leg portion with said first conductor engagement portion.

3. The electrical termination device of claim 1 wherein a second one of said plural connection legs includes a second conductor engagement portion including in an uncrimped condition a second support wall and a second pair of outwardly extending sidewalls for supporting a second connection extent of a second conductor, said second support wall being disposed in a plane spaced from and parallel to said plane of said central member and said second pair of side walls extending substantially perpendicular to said plane of said second support wall and to the plane of said central planar member for crimping around said second connection extent.

4. The electrical termination device of claim 3 wherein said plane of said central planar member lies between said planes of said first and second conductor engagement portions.

5. The electrical termination device of claim 1 wherein a third connection leg of said plurality includes means for mechanically and electrically connecting said body to a structural support member.

6. A crimpable electrical connector for mechanically and electrically connecting plural electrical conductors comprising:

a one-piece connector body formed of electrically conductive material;

said connector body having a central planar member;

a first connection leg extending from and directly attached to said central planar member, said first connection leg including a first conductor engagement portion for engaging a first conductor of said plurality, said first conductor engagement portion including in an uncrimped condition a first conductor support wall and a first pair of outwardly extending sidewalls, said first conductor support wall lying substantially in a plane spaced from and parallel to said plane of said central member; and a second condition leg extending from and directly attach to said central planar engagement portion for engaging a second conductor of said plurality, said second conductor engagement portion including in an uncrimped condition a second conductor support wall and a second pair of outwardly extending sidewalls, said second conductor support wall lying in a plane spaced from and parallel to said plane of said central planar member;

said plane of said central planar member lying between said planes of said first and second conductor engagement portions and said first and second pairs of outwardly extending sidewall extending in opposite directions perpendicular to said central planar member.

7. The electrical connector of claim 6 wherein said first connection leg includes a first bent transition region disposed between said central planar member and said first conductor engagement portion, said first transition region being bent out of the plane of said central planar member in a first direction.

8. The electrical connector of claim 7 wherein said second connection leg includes a second bent transition region disposed between said central planar member and said second conductor engagement portion, said second transition region being bent out of the plane of said central planar member in a second direction opposite said first direction.

9. The electrical connector of claim 8 further including a third connection leg extending from said central planar member, said third connection leg including a support accommodating portion for mechanically and electrically securing said connector body to an upright support.

10. The electrical connector of claim 9 wherein said connector body is formed from wrought copper.

* * * * *